G. A. NORMAN.
Animal Traps.

No. 139,182. Patented May 20, 1873.

Witnesses:—
C. C. Poole
Jno. Williams

Geo. A. Norman,
by his Atty.
Wm. H. Rowe.

UNITED STATES PATENT OFFICE.

GEORGE A. NORMAN, OF BALTIMORE, MARYLAND.

IMPROVEMENT IN ANIMAL-TRAPS.

Specification forming part of Letters Patent No. 139,182, dated May 20, 1873; application filed February 15, 1873.

*To all whom it may concern:*

Be it known that I, GEORGE A. NORMAN, of Baltimore, in the county of Baltimore and State of Maryland, have invented certain new and useful Improvements in Animal-Traps, of which the following is a specification:

The object of my invention is to provide a trap of simple construction that will present an open entrance, and can be easily operated upon by the animal in trying to reach the bait, so that a portion of the cage will strike the animal as it descends, and at the same time cover up his retreat by inclosing the entrance, as hereinafter more fully described.

Figure 1:
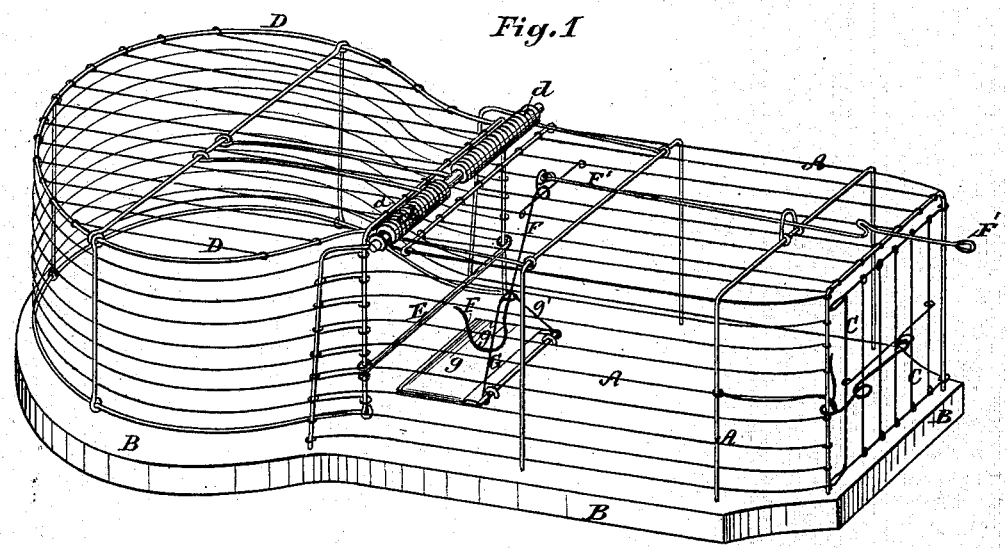
Figure 2:
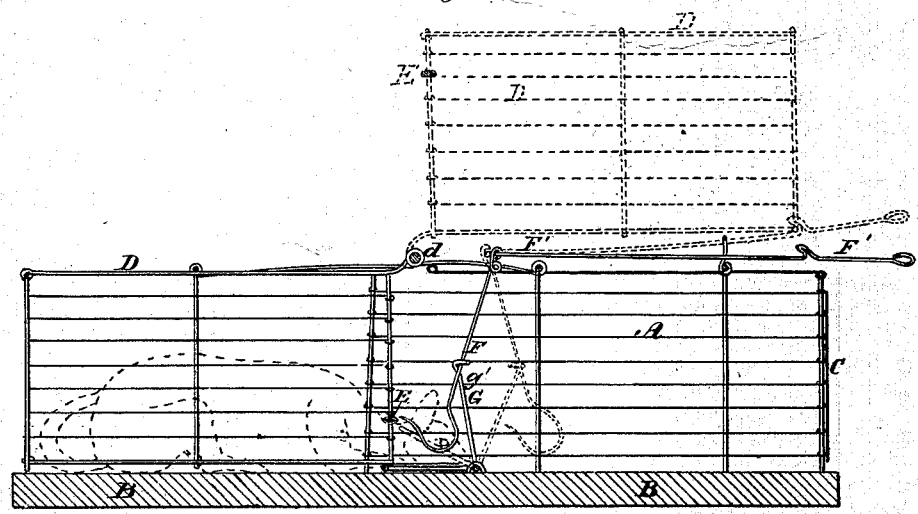

In the accompanying drawing, Figure 1 is a perspective view of my improved trap when closed; and Fig. 2, a longitudinal central sectional view of the same, representing the hinged cover by dotted lines in the position it is placed when the trap is set and ready to be sprung.

A wire net-work, A, is secured in a suitable manner to the base B, and is in this instance so formed that it will inclose a rectangular space at the sides and top. A door, C, is hinged to one end of the net-work, so that when closed a rectangular box or cage will be formed, open at one end only. A hood or cover, D, is connected by a spring hinge, $d\ d$, with the top of the wire net-work, and at the open end of the cage, in such manner that the hood can be folded back and held against the top of the cage A, when the trap is set and ready to be sprung, and when released will be thrown down by the force of the spring, so that it will rest upon the base B, thus forming a part of the cage, and inclosing the open end of the same. A cross-bar, E, is connected with the framing of the hood D, so as to form a brace for the same, and also serve to strike the animal a forcible blow as the hood descends, and materially aid in preventing its escape.

The hood is held up and released by a novel device, in the following manner: A bait-hook, F, is hinged to the top of the net-work A, and is coupled at its upper end with a latch-piece, F′, that is reciprocated within staples on the net-work A by the vibrations of the bait-hook. The latch-piece F′ has a hook at its end that engages with the frame of the hood D, and holds said hood back against the top of the net-work A until it is released by the movement of the bait-hook.

In order to better insure the release of the latch-piece from the hood when the bait is tampered with, I form a trigger-piece, G, having a foot-plate, $g$, that is hinged to the base B, directly in front of the bait, and provided with a triangular bail, $g'$, that is connected with the bait-hook in such manner that the triangular portion prevents the bait from being released from the hook. The trigger-piece G, by means of the bail $g'$, also serves to operate the bait-hook when it is pressed downwards by the animal in trying to reach the bait.

A further description of the construction and operation of the device is deemed unnecessary.

It will be understood that the main feature of this invention is the hinged hood, which leaves a large portion of the cage open and unprotected when it is raised, and suddenly closes said portion of the cage when the hood is released.

Various modifications of form and construction could be made in the above described device without departing from the spirit of my invention.

I claim as new, and desire to secure by Letters Patent—

1. The combination of the base B, fixed portion A, hinged hook D, and spring $d$, said parts being constructed and arranged to operate substantially as described.

2. In combination with the fixed portion of the cage A and the hinged hood D, the cross-bar E on the hood, said bar being arranged to strike the animal as the hood descends, substantially as set forth.

3. The combination, in an animal trap, of the latch-piece, the bait-hook, and the trigger-piece, arranged as described to prevent the withdrawal of the bait, and also to operate upon the hook to aid in springing the trap, substantially as set forth.

GEORGE A. NORMAN.

Witnesses:
P. M. BENNER,
H. W. DRAKELY.